(12) United States Patent
    Collins

(10) Patent No.: US 10,457,467 B2
(45) Date of Patent: Oct. 29, 2019

(54) INSULATED STORAGE SYSTEM

(71) Applicant: Chad Anthony Collins, Temple, TX (US)

(72) Inventor: Chad Anthony Collins, Temple, TX (US)

(*) Notice: Subject to any disclaimer, the term of this patent is extended or adjusted under 35 U.S.C. 154(b) by 0 days.

(21) Appl. No.: 16/176,236

(22) Filed: Oct. 31, 2018

(65) Prior Publication Data

US 2019/0062035 A1     Feb. 28, 2019

Related U.S. Application Data

(63) Continuation-in-part of application No. 15/265,283, filed on Sep. 14, 2016.

(60) Provisional application No. 62/285,794, filed on Nov. 9, 2015.

(51) Int. Cl.
| | | |
|---|---|---|
| *B65D 81/38* | (2006.01) | |
| *B62K 27/00* | (2006.01) | |
| *B62B 5/00* | (2006.01) | |
| *B62K 27/02* | (2006.01) | |
| *B62K 27/12* | (2006.01) | |
| *B60D 1/00* | (2006.01) | |

(52) U.S. Cl.
CPC ........ *B65D 81/3802* (2013.01); *B62B 5/0079* (2013.01); *B62K 27/003* (2013.01); *B62K 27/02* (2013.01); *B62K 27/12* (2013.01); *B60D 2001/003* (2013.01)

(58) Field of Classification Search
CPC . B65D 81/3802; B62B 5/0079; B62B 5/0083; B62K 27/003; B62K 27/02; B62K 27/12
See application file for complete search history.

(56) References Cited

U.S. PATENT DOCUMENTS

| | | | | |
|---|---|---|---|---|
| 2,001,205 | A * | 5/1935 | Marten | A63B 19/02 280/206 |
| 2,372,043 | A * | 3/1945 | Aghnides | B62D 61/00 180/10 |
| 3,746,117 | A * | 7/1973 | Alred | B62D 57/04 180/10 |
| 3,762,744 | A * | 10/1973 | Sidlauskas | B62D 61/00 280/207 |
| 4,192,395 | A * | 3/1980 | Barber | A63B 19/02 180/218 |
| 4,471,567 | A * | 9/1984 | Martin | A63H 33/005 446/437 |
| 6,298,934 | B1 * | 10/2001 | Shteingold | B62D 55/04 180/10 |
| 7,963,350 | B1 * | 6/2011 | Thielman | B62D 57/00 180/7.1 |
| 8,499,862 | B2 * | 8/2013 | Mondl | A63G 29/02 180/7.1 |
| 8,689,495 | B2 * | 4/2014 | Hill | E04H 9/028 52/79.1 |
| 8,876,134 | B2 * | 11/2014 | Esteves Palmeira | B60B 19/00 280/205 |

(Continued)

*Primary Examiner* — Derek J Battisti
(74) *Attorney, Agent, or Firm* — Christopher & Weisberg, P.A.

(57) ABSTRACT

An insulated container configured to store cold consumables is disclosed. The container has a body having a curved track wrapping around the body and upon which the body is able to be rolled. The body has an insulated wall encompassing a cavity configured to hold at least ice and consumables.

19 Claims, 21 Drawing Sheets

(56) References Cited

U.S. PATENT DOCUMENTS 9,481,414 B1* 11/2016 Thielman ................ F41A 23/28
2011/0120828 A1* 5/2011 King .................... A45C 13/385
                                                        190/18 A

* cited by examiner

INSULATED STORAGE SYSTEM

CROSS-REFERENCE TO RELATED APPLICATION

This application is a Continuation in Part of U.S. patent application Ser. No. 15/265,283, filed Sep. 14, 2016, entitled "INSULATED STORAGE SYSTEM", which claims the benefit of U.S. Provisional Application Ser. No. 62/285,794, filed Nov. 9, 2015, entitled "COOLER BALL SYSTEM", the entirety of which each is incorporated herein by reference.

TECHNICAL FIELD

Insulated storage systems.

SUMMARY

Some embodiments advantageously provide a container configured to store consumables. The container may be insulated and configured to store hot or cold consumables. In some embodiments, the container has a body having an insulated wall that encompasses a cavity, the cavity configured to hold consumables. A curved track is configured to wrap around the body and upon which the body is able to be rolled. In some embodiments, the curved track is one of spherical and ellipsoidal. In some embodiments, the curved track includes a curved band wrapping around the body, the circular band having interior gear teeth that mate with teeth of a plurality of interior gears attached to the container. In some embodiments, the container further includes a first hatch openable to load and unload the container; and a second hatch smaller than the first hatch and openable to retrieve consumables from the cavity. In some embodiments, the second hatch has recesses to receive fingers of a hand to enable opening of the second hatch. In some embodiments, the container further includes a leash attachable to the container and configured to pull the container so that the container rolls on the curved track. In some embodiments, the leash has a first end attachable to the container, a second end opposite the first end and having an actuator, and an air conduit along a length of the leash, the actuator facilitating sending a pulse of air through the air conduit and wherein the container further comprises a braking mechanism actuated by the pulse of air to brake the container.

In some embodiments, the container further includes retractable feet extending from the body upon which the container rests when the retractable feet are extended. In some embodiments, the retractable feet are extendible and retractable by operation of at least one lever. In some embodiments, the body is configured to float in water. In some embodiments, the body has in the cavity at least one ballast tank to stabilize the container when in water. In some embodiments, holes in the body enable water to fill the at least one ballast to stabilize the container when in water. In some embodiments, the holes in the body can be sealed when the at least one ballast tank is filled with air. In some embodiments, the container further includes a towing bar attachable to the container and configured to pull the container so that the container rolls on the curved track.

According to one aspect, a container ball includes a body, the body being one of spherical and ellipsoidal in shape, the body having an insulated wall and a cavity, and a rotatable track wrapped around the body and upon which the body is able to be rolled. In some embodiments, the container ball may include a ballast tank that may be filled at least in part with a gas. In some embodiments, the container ball may include a ballast tank that may be filled at least in part with a liquid. In some embodiments, the container ball may further include a leash attached to the body, the leash having a braking mechanism.

According to another aspect, a container carrier is configured to hold a container having a curved track wrapping around the body of the container and upon which the body is able to be rolled. The container carrier includes a basket configured to receive the container, a cage configured to secure the container in the basket, and a trailer hitch tube coupled to the basket to enable the container carrier to be hitched to a standard hitch receiving tube on a motor vehicle. In some embodiments, the container is orientable within the basket and cage to enable opening at least one hatch of the container when the container is in the container carrier. In some embodiments, the container is orientable within the basket and cage so that the curved track has an axis that is perpendicular to an axis of the trailer hitch tube when the container is in the container carrier.

According to yet another aspect, an insulated container to store items is provided, the container having one of a spherical and an ellipsoidal shape. The container includes a circumferential trench surrounding a body of the container and having two oppositely positioned channels, each channel configured to receive wheels, the wheels oriented in pairs, each wheel of a pair of wheels oppositely positioned in the channels and connected by an axle, the wheels configured to roll while the container remains upright.

According to another aspect, some embodiments include an insulated container configured to store consumables. The container includes a body having an insulated wall that encompasses a cavity, the cavity configured to hold consumables. The container further includes a circumferential trench configured to wrap around a circumference of the body, the trench having opposite facing walls, each wall having a groove configured to receive wheels configured to roll within the groove about the circumference of the body. The container further includes a plurality of wheels positioned in the grooves on opposite facing walls and configured to roll while the container remains upright.

According to yet another aspect, an insulated container ball is provided, including a body, the body being one of spherical and ellipsoidal in shape, the body having an insulated wall that encompasses a cavity. The container ball also has a rotational apparatus having: a circumferential trench around a circumference of the body, the trench having walls with a channel in each wall to enable wheels to roll within the channels. The rotational apparatus also includes a plurality of pairs of wheels, each wheel in a pair being positioned to roll within opposite channels while the container remains upright.

BRIEF DESCRIPTION OF THE DRAWINGS

Embodiments described herein, and the attendant advantages and features thereof, will be more readily understood by reference to the following detailed description when considered in conjunction with the accompanying drawings wherein.

DETAILED DESCRIPTION

Figure 1:
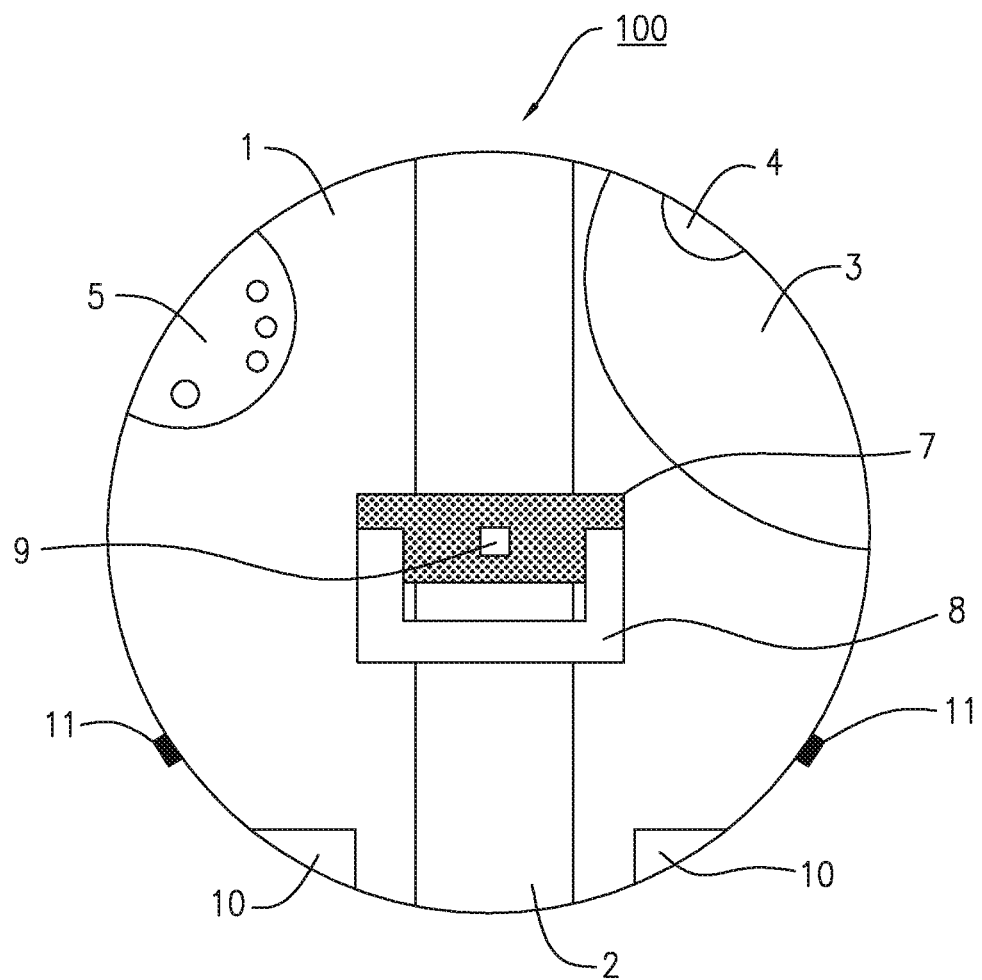
FIG. 1 illustrates a first view of a container constructed in accordance with principles set forth herein.

Before describing in detail exemplary embodiments, it is noted that the embodiments reside primarily in combinations of apparatus components and processing steps related to towable, floating containers. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments include a container ball that is a spherical insulated container for storing consumables that can easily be transported, can easily roll and be maneuvered over rough and smooth surfaces, can float in both fresh and salt water while maintaining a desirable center of balance, while providing easy access to contents.

One advantage of the container is maneuverability and convenience in handling which is the result of a rotating curved track that wraps around a circumference of the container ball that allows the container to roll. In contrast to an external or protruding set of wheels, the rotating curved track allows the container to easily pivot about a single point where the track makes contact with the surface upon which it rolls, while maintaining balance and uniform moment of inertia. The rotatable curved track may be in contact with a series of internal rollers or gears that are around the circumference of the container. Note also that the rotatable curved track has a width and flatness that is chosen to reduce any tendency of the insulated container to roll to one side.

The container can be pulled by a detachable leash that plugs into a receptor that may be located at a handle mount at about one half the height of the container. The detachable leash may have a handle on the loose end that has a button that can be depressed by a user's thumb. Depression of the button enables a pulse of air that runs through an air tube contained in the leash. The pulse of air actuates a braking mechanism that applies frictional resistance to the undersurface of the curved track. Braking allows a user to slow or stop motion of the container when pulling the container along smooth surfaces so the container does not bump into the user. Note that pump action of the handle may be employed to pump air into one or more ballast tanks. In addition, in the alternative, a pressurized gas cylinder, such as a $CO_2$ or air cylinder may be provided to discharge gas into a ballast tank.

Access to the interior of the container is by means of two different hatches. A large hatch allows convenient access to the interior for loading ice and consumables into the container. This large hatch may be secured with a rotating latch that locks the large hatch into a closed position. A small hatch is intended to allow convenient access to the contents of the container when it floats in the water with minimal risk of accidentally spilling contents or allowing water to flow into the container when the container is floating in water. The small hatch may be a round twist-off hatch that bowling ball style thumb and finger holes to allow user to twist off the hatch while holding onto the container.

Another feature of the container is a set of retractable feet that can be deployed to raise the container's rotatable curved track off the ground so that it remains stationary. Each pair of retractable feet can be deployed and retracted by means of pulling a lever. Four separate watertight hatches may open to deploy the feet and to conceal the feet when retracted.

The container may have drain holes and plugs located at a base of the container below the feet levers to allow water to drain from the interior of the container. In some embodiments, there are 12 small flood/drain holes located in the bottom hemisphere of the container that connect to small internal ballast tanks. These tanks can be flooded when the container does not have enough contents to provide sufficient weight to stabilize the container in water. Ideally, the container should float with the water line at the equator of the container. In contrast, the ballast tanks can be sealed internally with plugs in order to hold air when the container is loaded with heavy contents stabilize the buoyancy of the container in water.

An optional component is a container carrier that includes a steel basket and cage for transporting the container on the back of an automobile. The basket has an insert that securely plugs into a standard receiver hitch tube that is fixed to the vehicle. The container can be lifted by its handles and placed in the basket and secured by folding steel cage straps. The cage straps may be hinged to the basket. When the cage straps are locked into place over the container via a latching mechanism, both the small hatch and the large hatch are accessible. The container may be oriented in the basket so that the rotatable curved track is parallel to the receiver hitch.

FIG. 1 illustrates a first view of a container 100 constructed in accordance with principles set forth herein. The container 100 has an insulated body 1 enclosing a cavity to hold cold consumables. The insulated container is curved with a curved, rotatable track 2 wrapping around the body 1 and upon which the body 1 is able to be rolled. In some embodiments, the curved track 2 is removable. The insulated container 100 has a large hatch 3 that is hinged at a lower edge to allow convenient access to the interior of the insulated container 100 in order to load the insulated container with ice and consumables such as drinks, for example, or in order to load hot consumables such as sandwiches, for example. The large hatch 3 is equipped with a latch 4 that release-ably locks the hatch 3 into a closed position. In some embodiments the insulated container 100 is spherical or elliptical in shape.

A small porthole hatch 5 is intended to allow convenient access to remove contents of the insulated container 100 when the insulated container 100 floats in water. The small hatch 5 is small to minimize risk of accidentally spilling contents of the insulated container and to minimize risk of water flooding the cavity enclosed by the body 1. Small hatch 5 may twist to open or close the small hatch 5. Attached to either side of the body 1 are handle mounts 7 to which handles 8 are connected. In either or both of two handle mounts 7 is a receptor 9 which receives a leash.

Four watertight hatches 10 may be configured to deploy four retractable feet which may be deployed using deployment/retraction levers 11. When the retractable feet are deployed, the insulated container 100 rests on the feet and the rotatable curved track 2 is off the ground.

Figure 2:
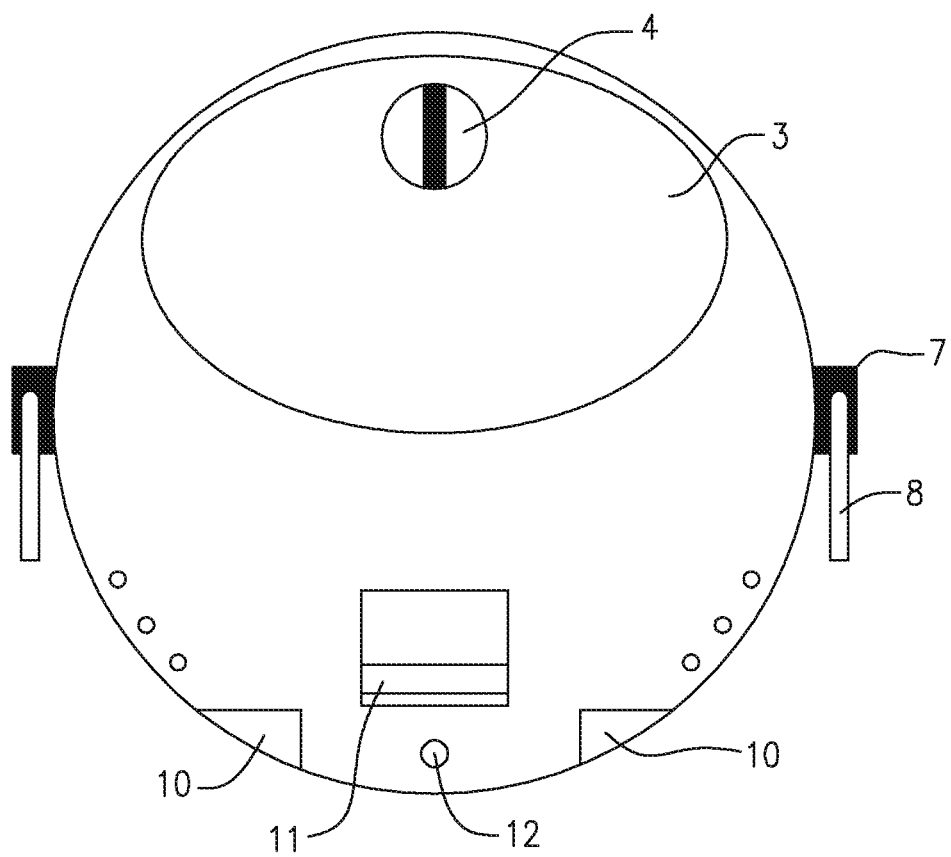
FIG. 2 is a second view of an embodiment of a container.

FIG. 2 is a second view of the insulated container 100 perpendicular to the first view of FIG. 1. FIG. 2 shows the latch 4 in the large hatch 3, the handle mounts 7 and handles 8, and the watertight hatches 10 that are configured to store retractable feet upon which to rest the insulated container 100, the retractable feet being deployed or retracted by a lever 11. FIG. 2 also shows drain plugs 12 which plug a drain hole to allow water to be drained from the insulated container 100.

Figure 3:
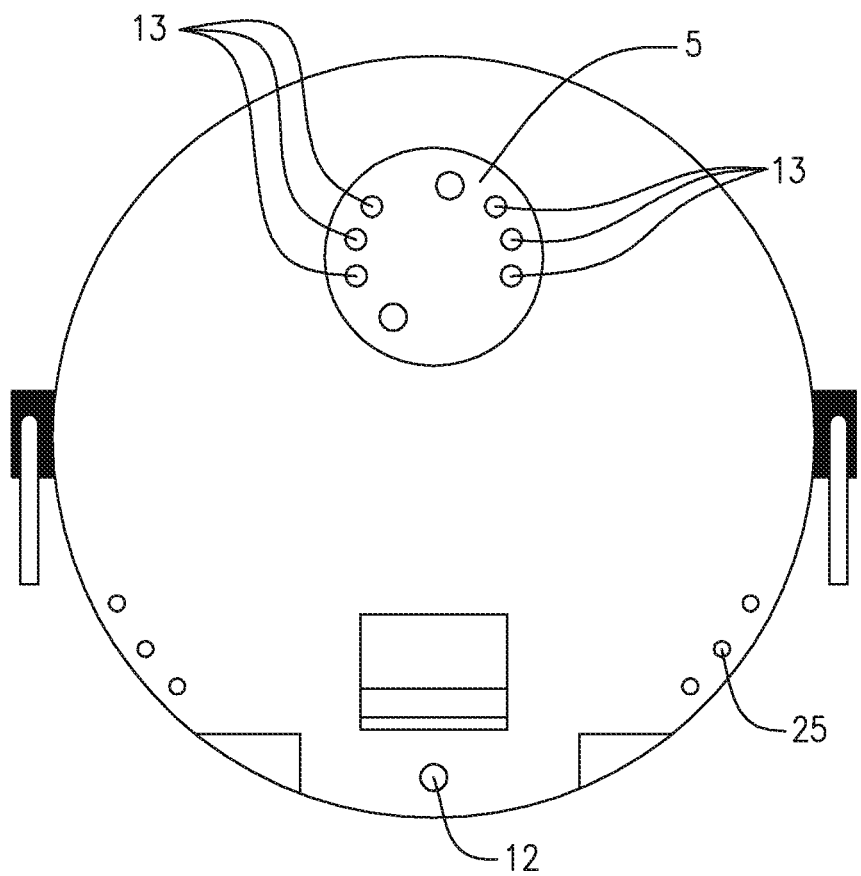
FIG. 3 is a third view of an embodiment of the container.

FIG. 3 is a side view of the insulated container 100 that is opposite of the side view of FIG. 2. FIG. 3 shows that small hatch 5 has holes 13 for fingers and thumb to grasp and open and close the small hatch 5. The holes 13 may accommodate both right-handed and left-handed users.

Figure 4:
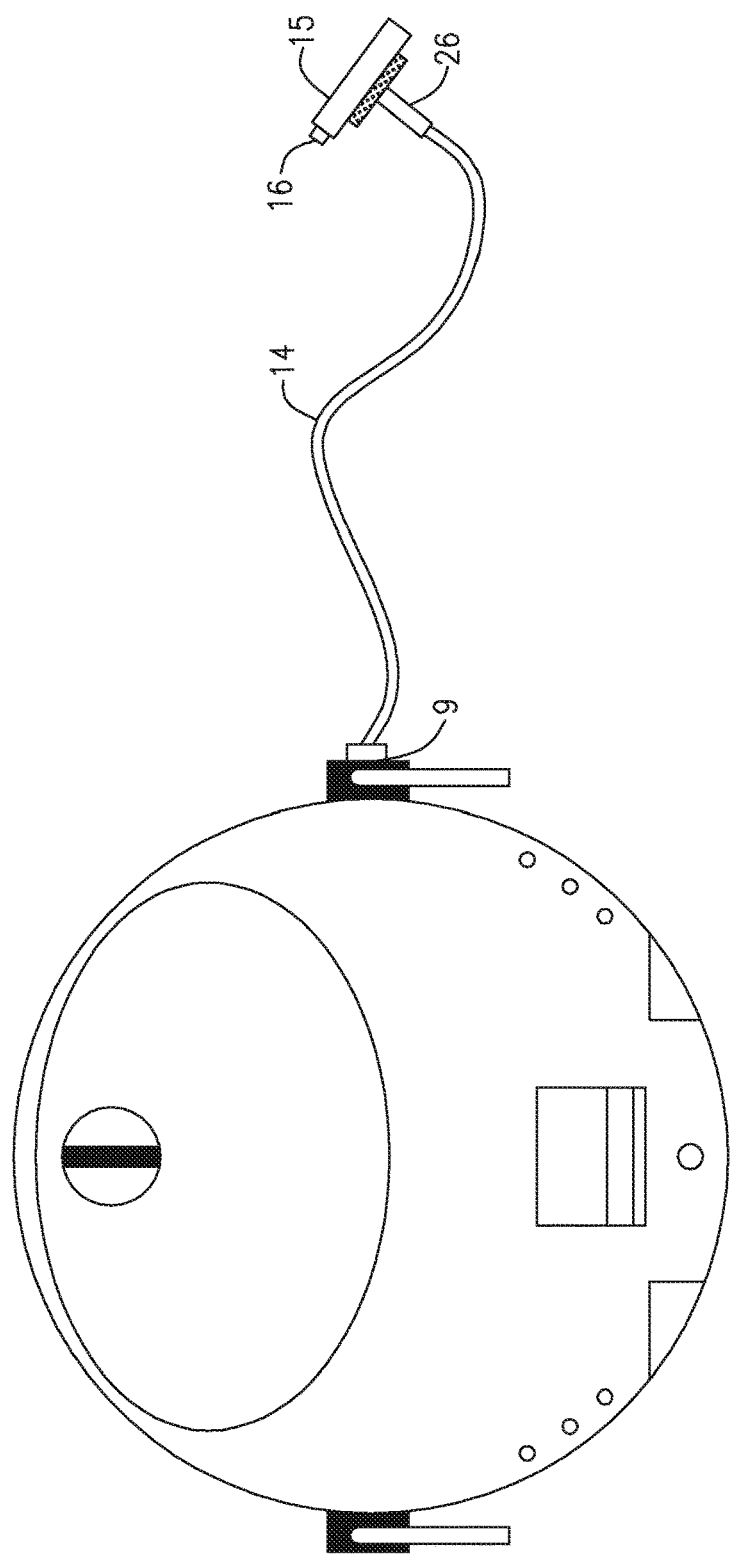
FIG. 4 is a view of a container connected to a leash.

FIG. 4 is a side view of the insulated container 100 showing a leash 14 connected to the receptor 9 at a first end. The leash 14 has a pump 15 at an opposite end. The pump 15 has a button 16 and possibly a gas cylinder 26 to inflate ballast tanks. In some embodiments, the leash 14 encloses an air tube that conducts a pulse of air created by depressing the button 16. The pulse of air actuates a mechanism (not shown), such as a brake pad or gear lever, that brakes rollers or gears of the rotatable curved track 100 to stop or retard the motion of the insulated container 100. The pump 15 may also be employed to pump air into ballast tanks 18. In an alternative embodiment, the air tube could instead be a tube carrying a liquid such as hydraulic fluid responsive to an actuator to provide hydraulic braking of the insulated container 100.

Figure 5:
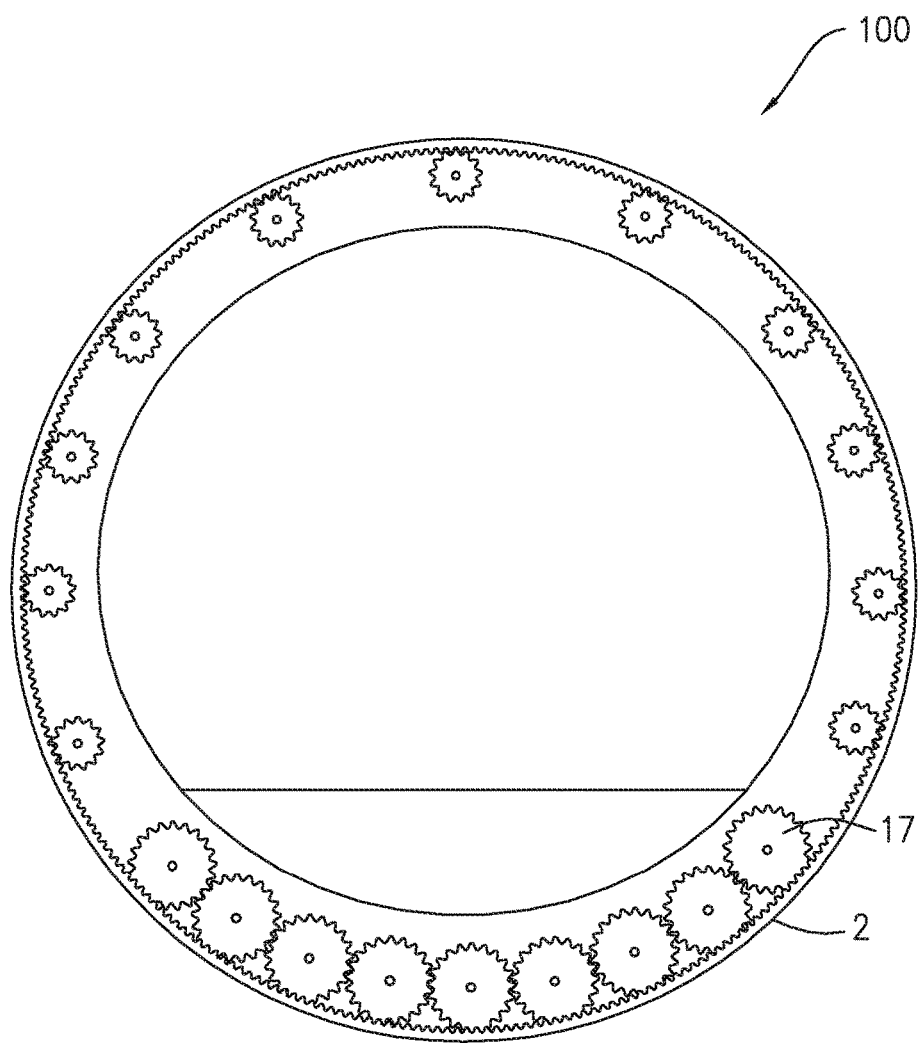
FIG. 5 is a side view showing a rotatable curved track and gears.
Figure 6:
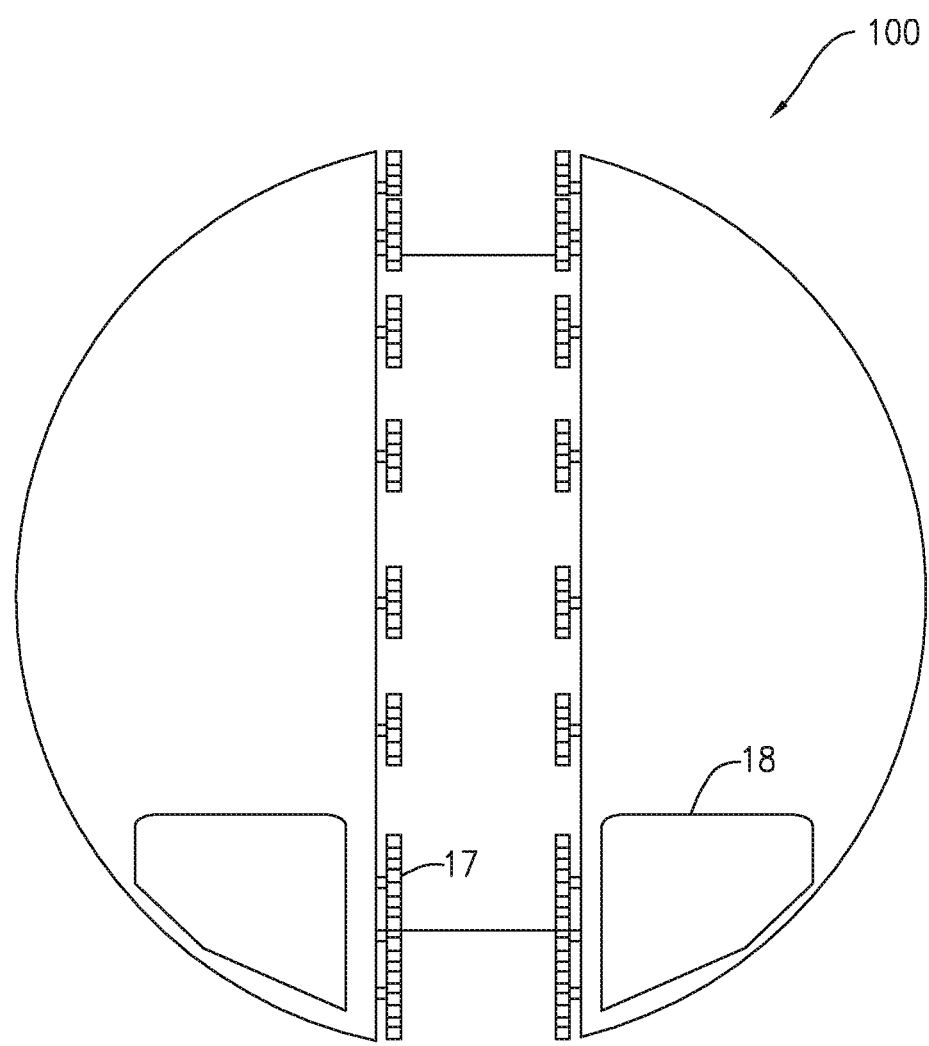
FIG. 6 is a front view showing gears that mesh with a rotatable curved track.

FIG. 5 is a side view showing the rotatable curved track 2 having gear teeth that mate with gear teeth of gears 17 so that when the insulated container 100 is being pulled by the leash 14, gears 17 rotate about their axes. FIG. 6 is a front view of the insulated container 100 showing the gears 17 and ballast tanks 18. In some embodiments, the gears 17 may be replaced by rollers, such as rubber wheels, and the gear teeth of the rotatable curved track 2 may be replaced by a roller, such as a rubber wheel. When the rotatable curved track 2 makes contact with a surface such as a surface of the earth and is pulled by the leash 14, the insulated container 100 may pivot about the point of contact and roll along the surface.

Figure 7:
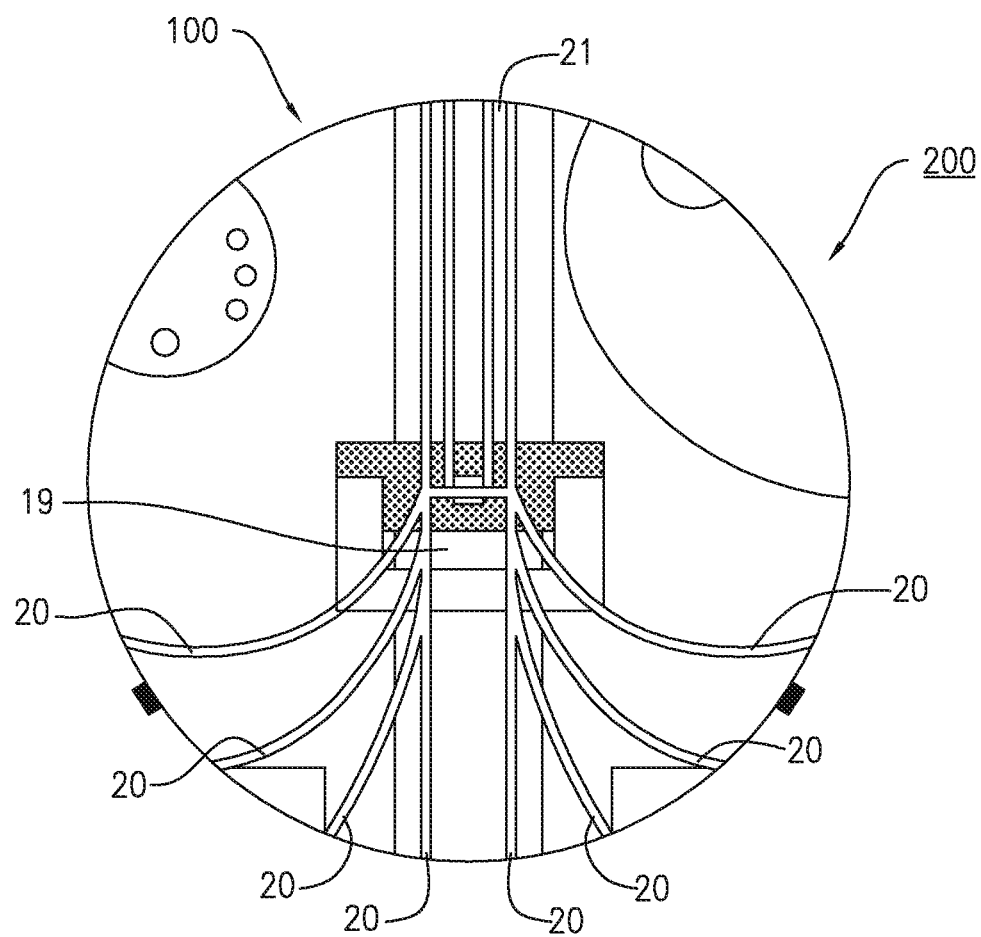
FIG. 7 is view of a container in a container carrier.

FIG. 7 is view of the insulated container 100 in an insulated container carrier 200 having a basket with a hinge 19 and cage ribs 20 configured to receive and hold the insulated container 100. Cage strap 21 is hinged to the cage ribs 20.

Figure 8:
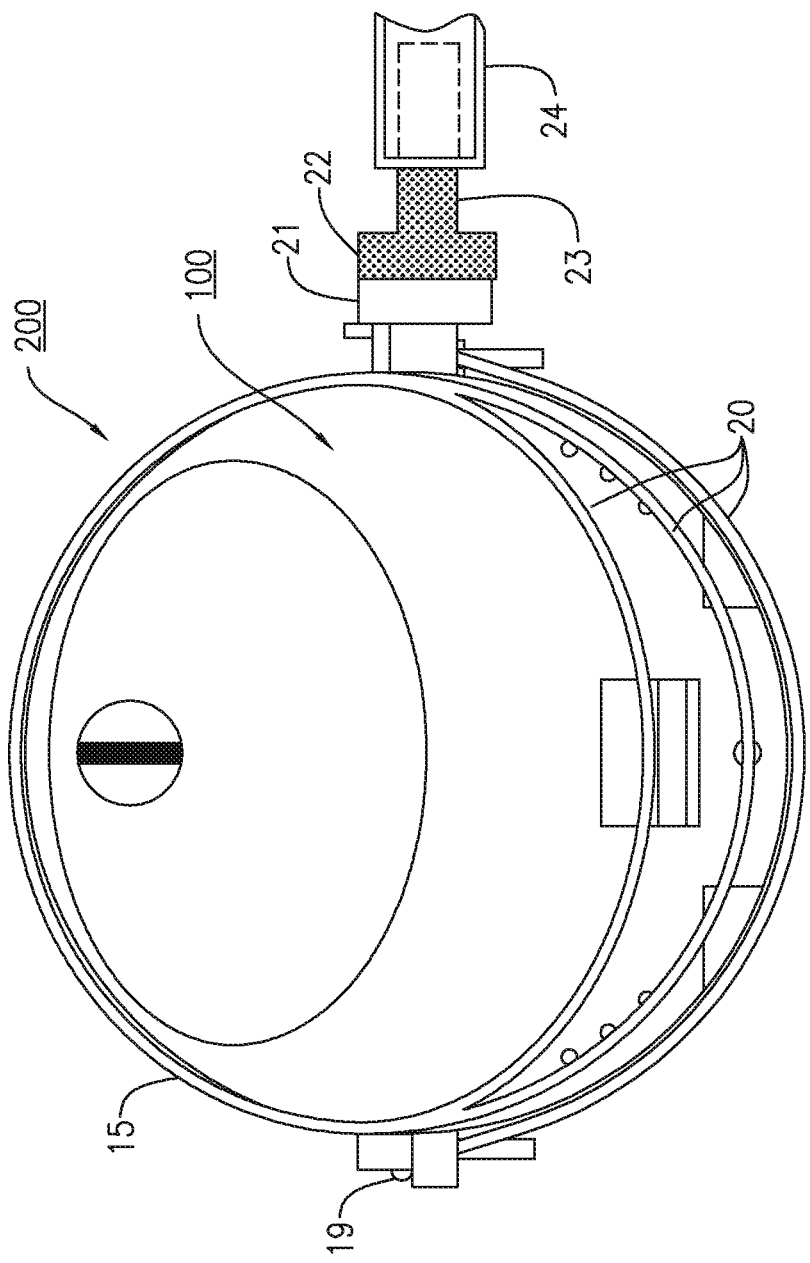
FIG. 8 is a view of the container carrier mounted to a vehicle hitch.

FIG. 8 is a view of the insulated container 100 in the insulated container carrier 200. The insulated container carrier 200 is configured to mount to a receiver hitch of an automobile. The basket has a latching mechanism 21 that enables attachment of a plate 22 that is fixed to the steel basket. The plate 22 may be affixed to an insert 23 that inserts into a receiver hitch 24 of an automobile so that the insulated container 100 and insulated container carrier 200 can be mounted to the back of the automobile.

Thus, the insulated container 100 can be lifted up via its handles 8 and placed in the steel basket and secured by folding the straps 20 of the basket over the insulated container 100 and locking the straps 20 into place. The cage 21 is hinged by hinge 19 to the basket. When the insulated container 100 is in the insulated container carrier 200, both the insulated containers hatches 3 and 5 are accessible and the rotatable curved track has a center axis that is perpendicular to an axis of the receiver hitch 24.

The insulated container 100 also may have drain holes 25, (see FIG. 3), located at or near the bottom of the insulated container 100 that connect to small internal ballast tanks 18. The ballast tanks 18 may be flooded when the insulated container 100 does not have enough content weight to stabilize the insulated container when it floats. Ideally, the insulated container 100 may float with the water line at the equator of the insulated container 100. In contrast, the ballast tanks 18 can be sealed with plugs in order to hold air when the insulated container 100 has heavy contents in order to stabilize the buoyancy of the insulated container 100 in water.

Figure 9:
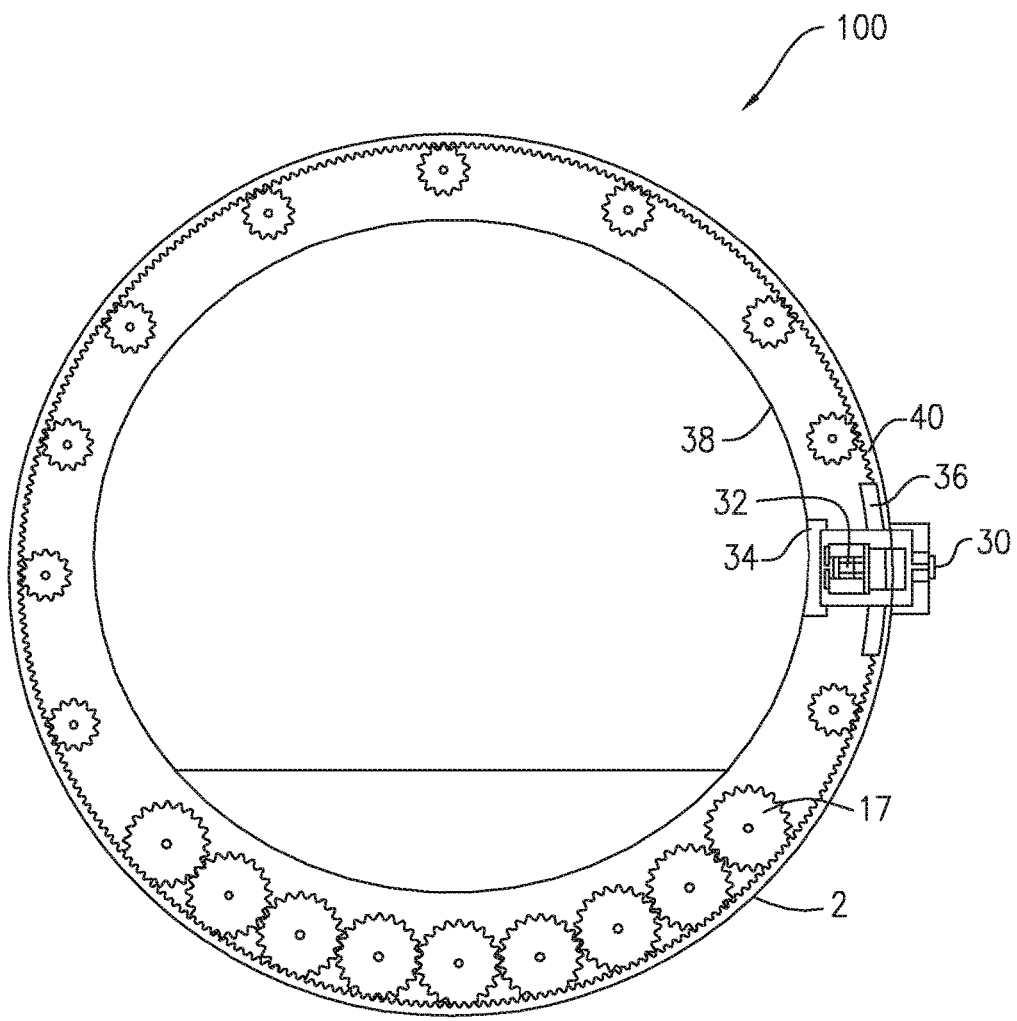
FIG. 9 is a view of a braking mechanism.

FIG. 9 shows a view of the braking mechanism that is activated by a pulse of air from the actuator 15 conducted to a receiver 20 which transmits pressure to a cylinder 32, which applies force to brake pads 36. Element 34 is a mounting bracket that supports the braking mechanism. Brake pads 36 press against surfaces 38 and 40 to brake the rotation of the insulated container 100. When the actuator 15 is depressed a pulse of air impinges on the cylinder 32 which forces the brake pads 36 against surfaces 38 and 40.

Figure 10:
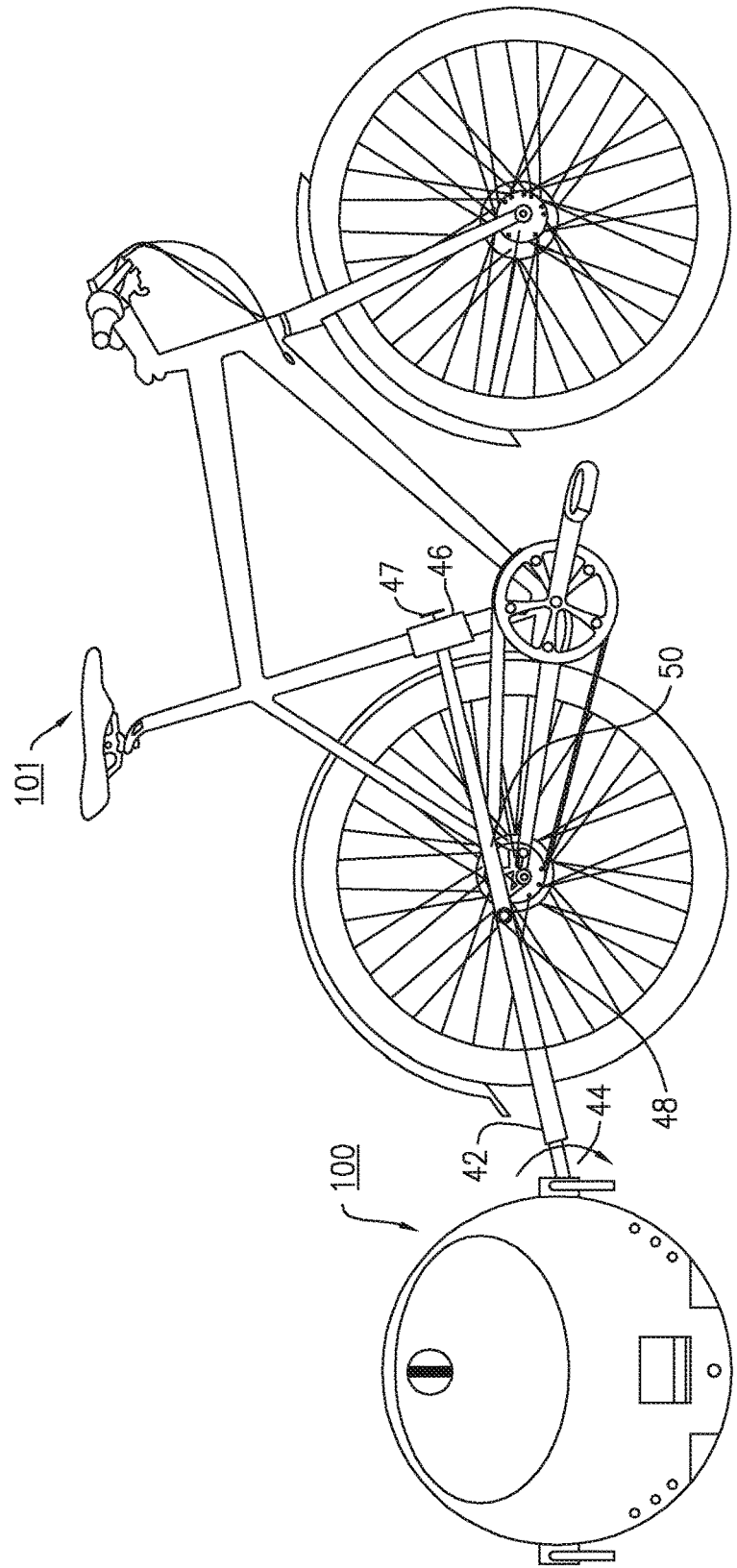
FIG. 10 is a side view of a towing bar connected to a bicycle.
Figure 11:
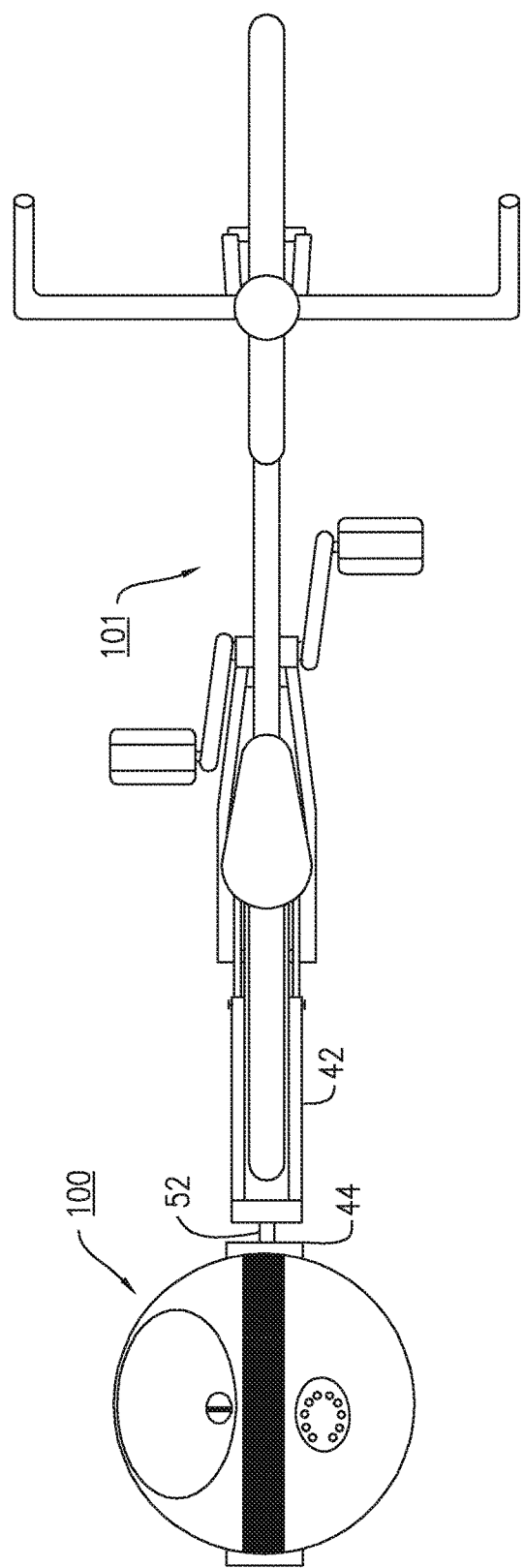
FIG. 11 is a top view of the towing bar and bicycle.
Figure 12:
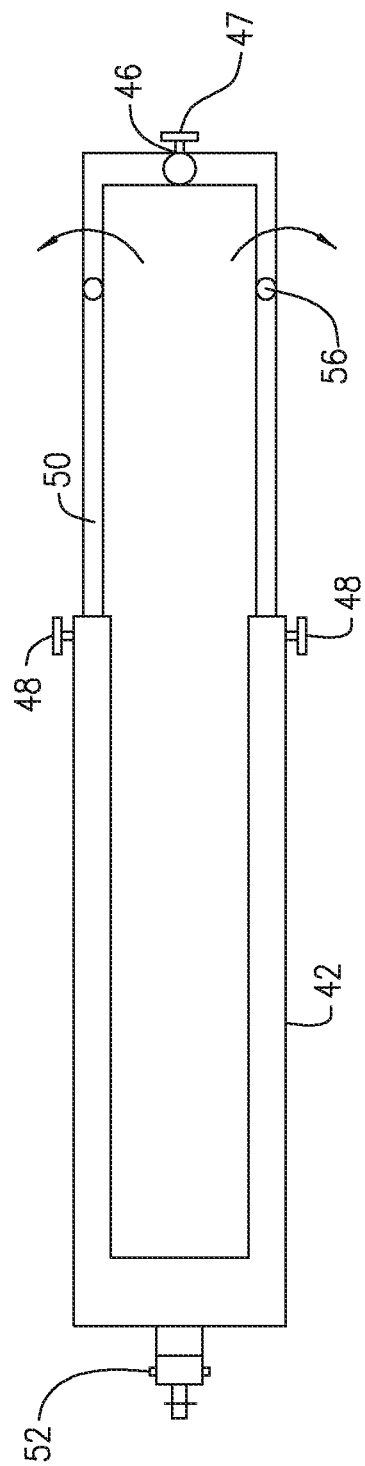
FIG. 12 is a top view of the towing bar.

FIG. 10 is a side view of an insulated container 100 being towed by a bicycle 101 by a towing bar 42. The towing bar 42 is coupled to the insulated container 100 at a pivoting connection 44. The towing bar 42 is attached to the bicycle by knobs 48 and a collar 46 which has a tightening knob 47. In some embodiments, the collar 46 is a clamp with two parts that are held in place on the bicycle's seat tube with the tightening knob 47. The towing bar 42 has a telescoping bar 50 which may extend and retract to adjust to different sized bicycles. FIG. 11 is a top view of the insulated container 100, bicycle 101 and towing bar 42. The towing bar 42 is coupled to the pivoting connection 44 by a joint 52. Joint 52 allows for pitch and roll about a longitudinal access of the towing bar 42 without allowing yaw motion. FIG. 12 is a top view of the towing bar 42 with joint 52 and connection pin, tightening knobs 48 and 47, collar 46 and telescoping bar 50. Also, the telescoping bar 50 of the towing bar 42 may have a pivot joint 56 that enables pivoting of the telescoping bar 42.

Figure 13:
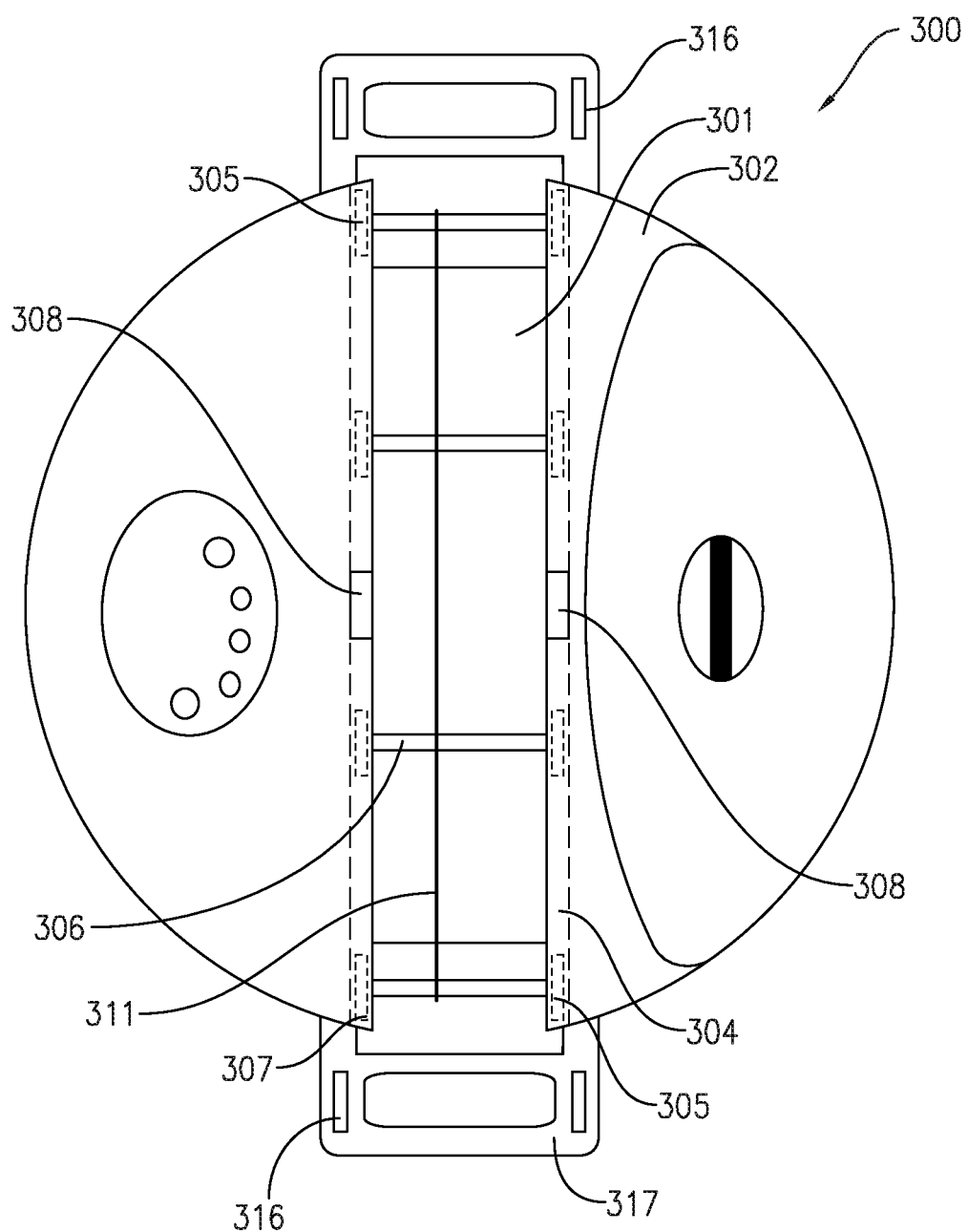
FIG. 13 is top view of the container showing a trench with channels and wheels.

FIG. 13 is a top view of the insulated container 100 having a trench 301 that wraps around of body 302 of the container 100. The trench 301 has channels 304, which may be grooves, on each side of the trench 301. The channels 304 receive wheels 305 arranged in pairs on opposite sides of the channels 304. The wheels 305 of each pair are connected by an axle 306. The channels 304 have flanges 307 that are configured to retain the wheels 305 within the channels 304. At the very top of the body 302 are located slots 308 in each channel 304 on opposite sides of the trench 301 to enable a pair of wheels to be inserted into the channels 304. Note that each axle 306 may pass through a rigid or flexible tube that may function as a journal bearing.

Figure 14:
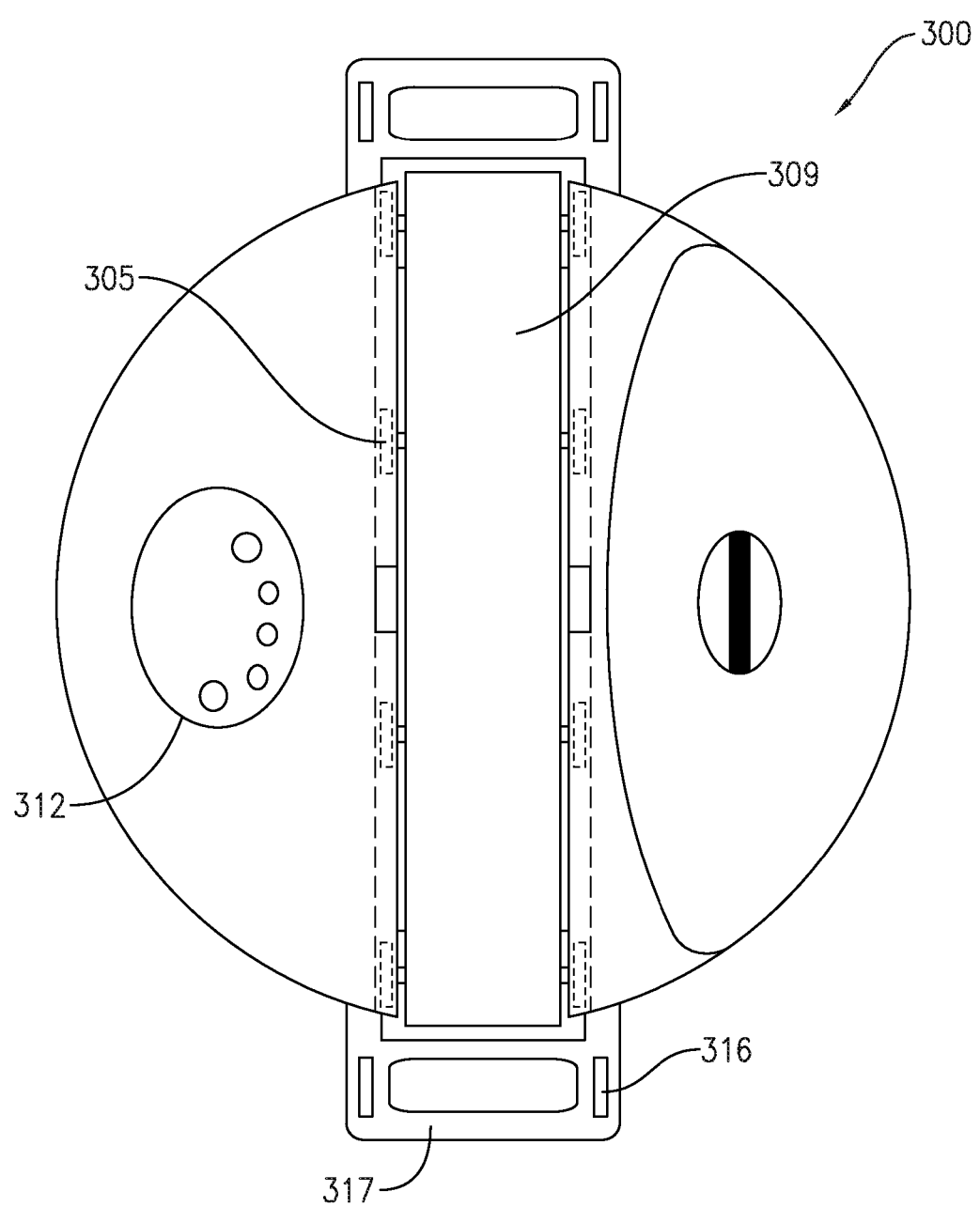
FIG. 14 is a top view of the container having a track.

FIG. 14 is another view of the insulated container 100 having a track 309 that wraps around the trench 301 such that the tubes around the axles 306 roll against the track 309 so that when the insulated container 100 is pulled, the track 309 will roll but the insulated container 100 will remain upright. In another embodiment, there are connectors on an inside surface of the track 309 that connect to the tubes around the axles 306, such that the wheels 305 will roll while the container 100 remains upright. In some embodiments, a stringer 311 wraps around the container 100 and connects to each of the tubes that surround the axles 306 of the wheel pairs to hold the wheels in a fixed spaced-apart arrangement about the container 100, so that the wheels do not roll to the bottom of the container 100. The track 309 may be a band that attaches at its ends by a latching mechanism. FIG. 14 also shows handles 315 with slots 316, the slots 316 to be used to secure an external saddle tank 314 to be described below.

Figure 15:
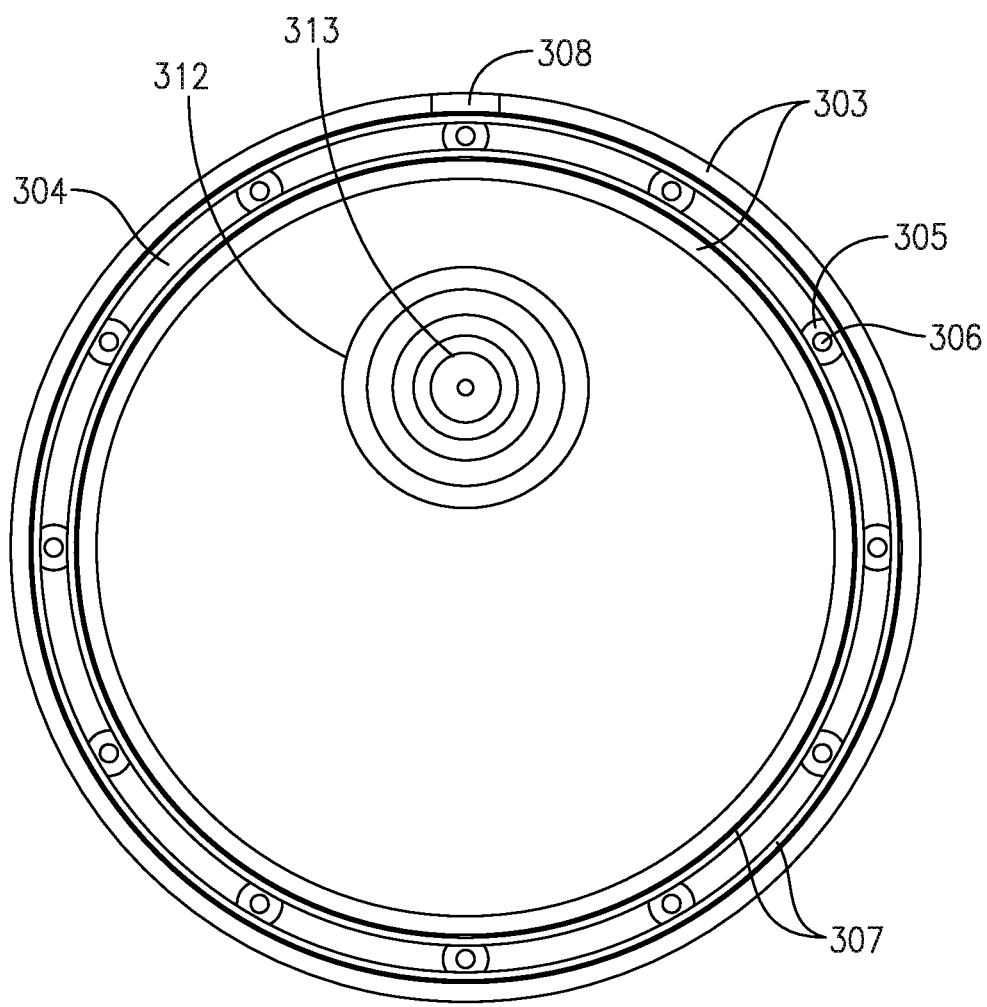
FIG. 15 is a side view of the container showing the channels and wheels as well as membrane.

FIG. 15 is a side view of the container 100 that shows the inner and outer surfaces 303 of the container 100. The channels 304 surround the circumference of the container 100. FIG. 15 shows the wheels 305 with axles 306, the wheels 305 being constrained to the channels 304 by the flanges 307. The slots 308 enable the wheel pairs to be inserted into the channels 304 or removed from the channels 304.

FIG. 15 also shows a round porthole 312 in a side of the container 100, the porthole 312 having a penetrable membrane 313 in the insulated wall, the membrane 313 being normally closed to form a barrier between air inside and outside the container. The membrane 313 may have a small orifice at its center and the membrane 313 is stretchable and penetrable by force to enable retrieval of an item from the container 100 or place an item in the container 100.

Figure 16:
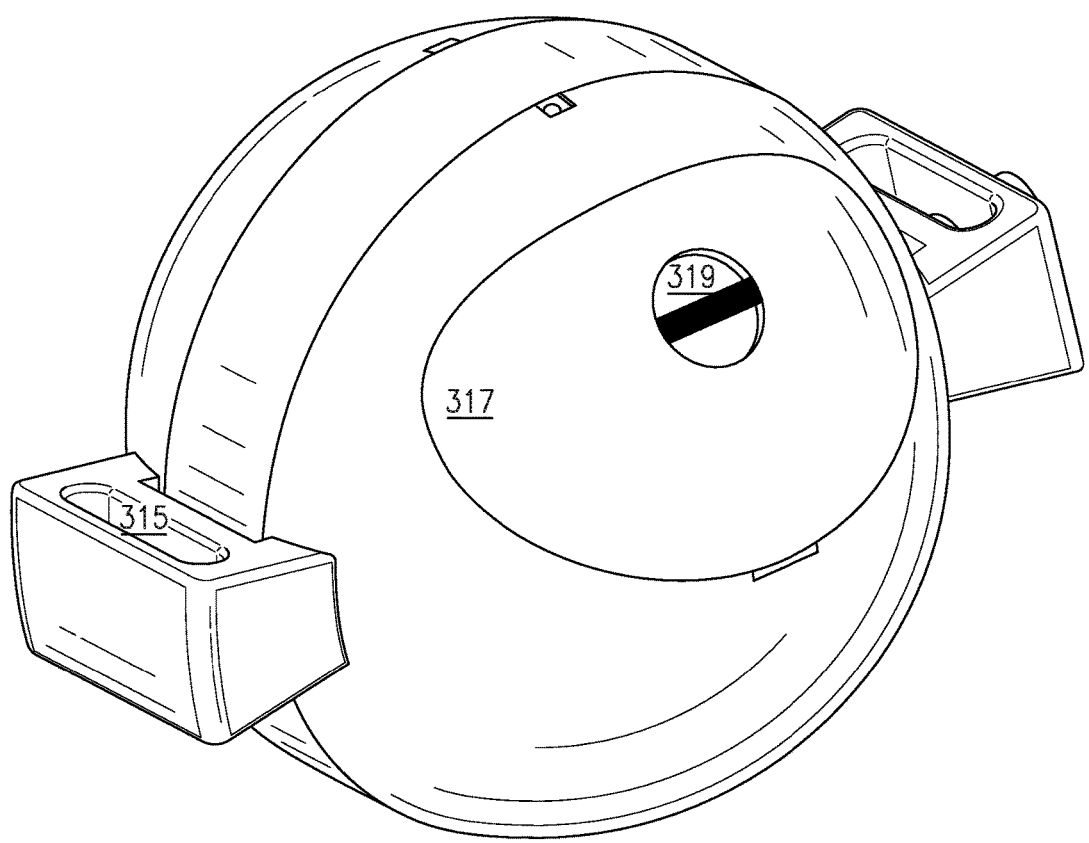
FIG. 16 is a perspective view of the container showing the handles and the main hatch.

FIG. 16 is a perspective view of the container 100, showing the track 309, the handles 315, a main hatch 317 with a dial handle 319 to open and close the main hatch 317.

Figure 17:
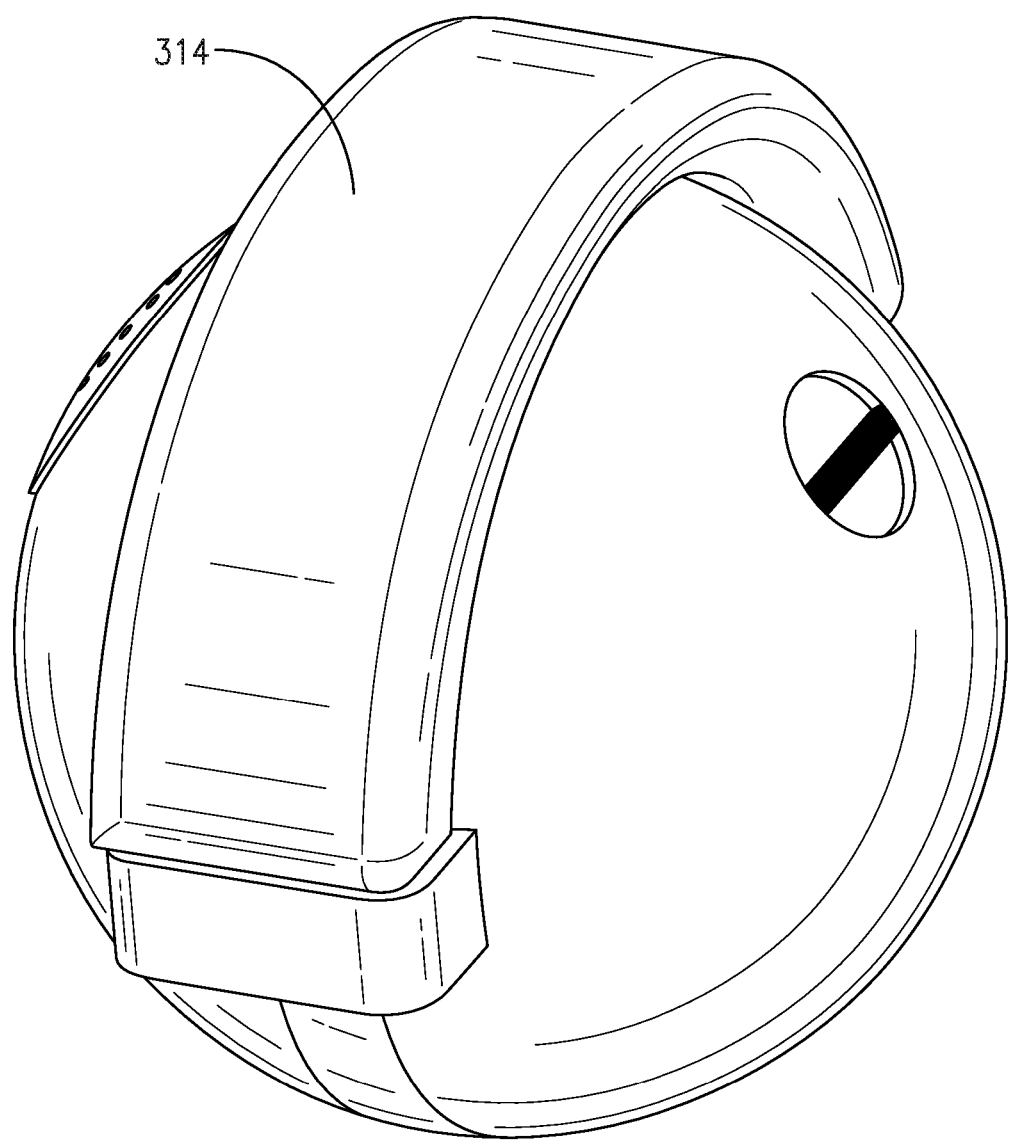
FIG. 17 is a perspective view of the container with an external saddle tank.
Figure 18:
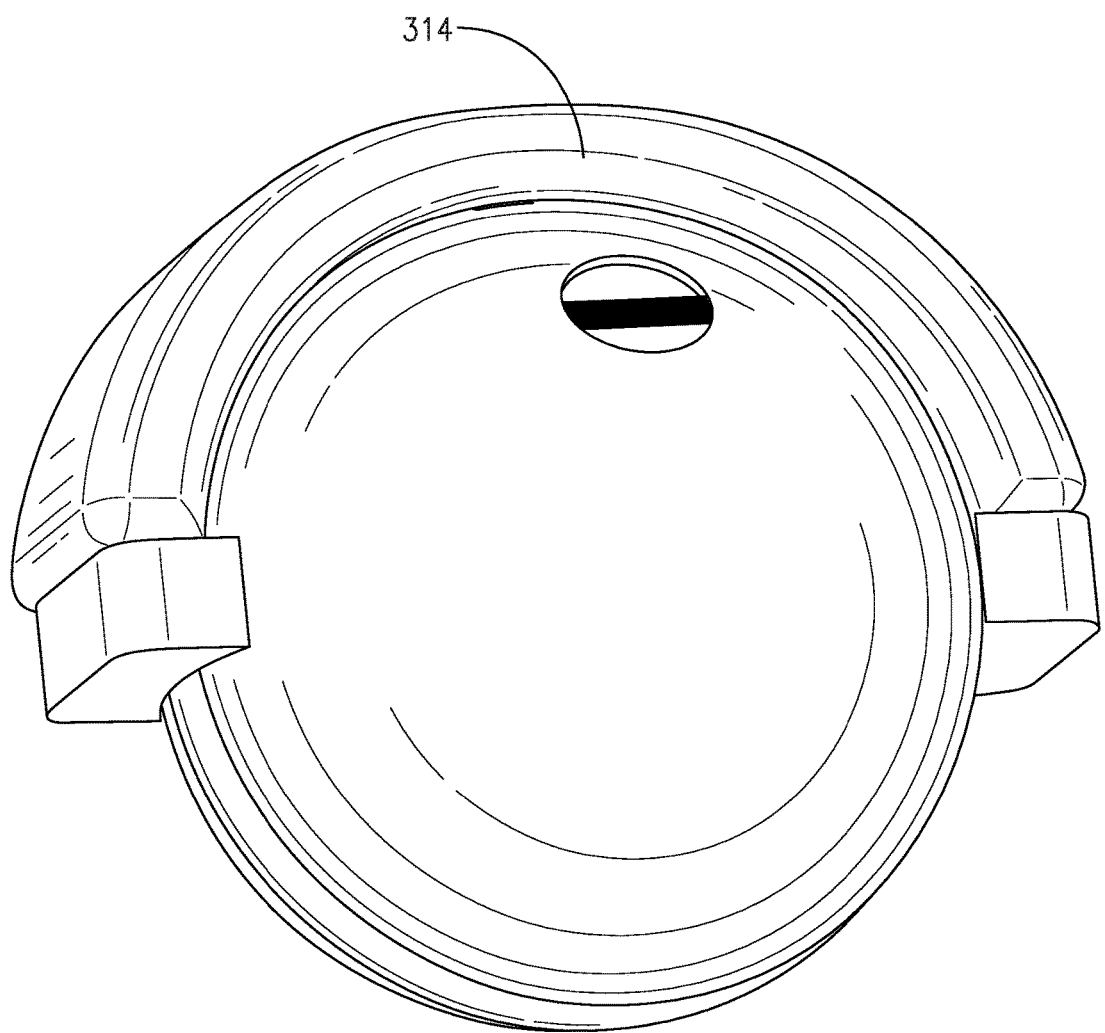
FIG. 18 is another perspective view of the container with the external saddle tank.

FIG. 17 shows the container 100 with an external saddle tank 314 conforming to the surface of the container 100 and attached by slots 316 to the handles 315 (see FIGS. 14 and 16). The saddle tank 14 may be an optional component that can help stabilize and provide extra buoyancy to the container 100 when the container 100 is in the water. FIG. 18 shows another view of the container 100 with the external saddle tank 314.

Figure 19:
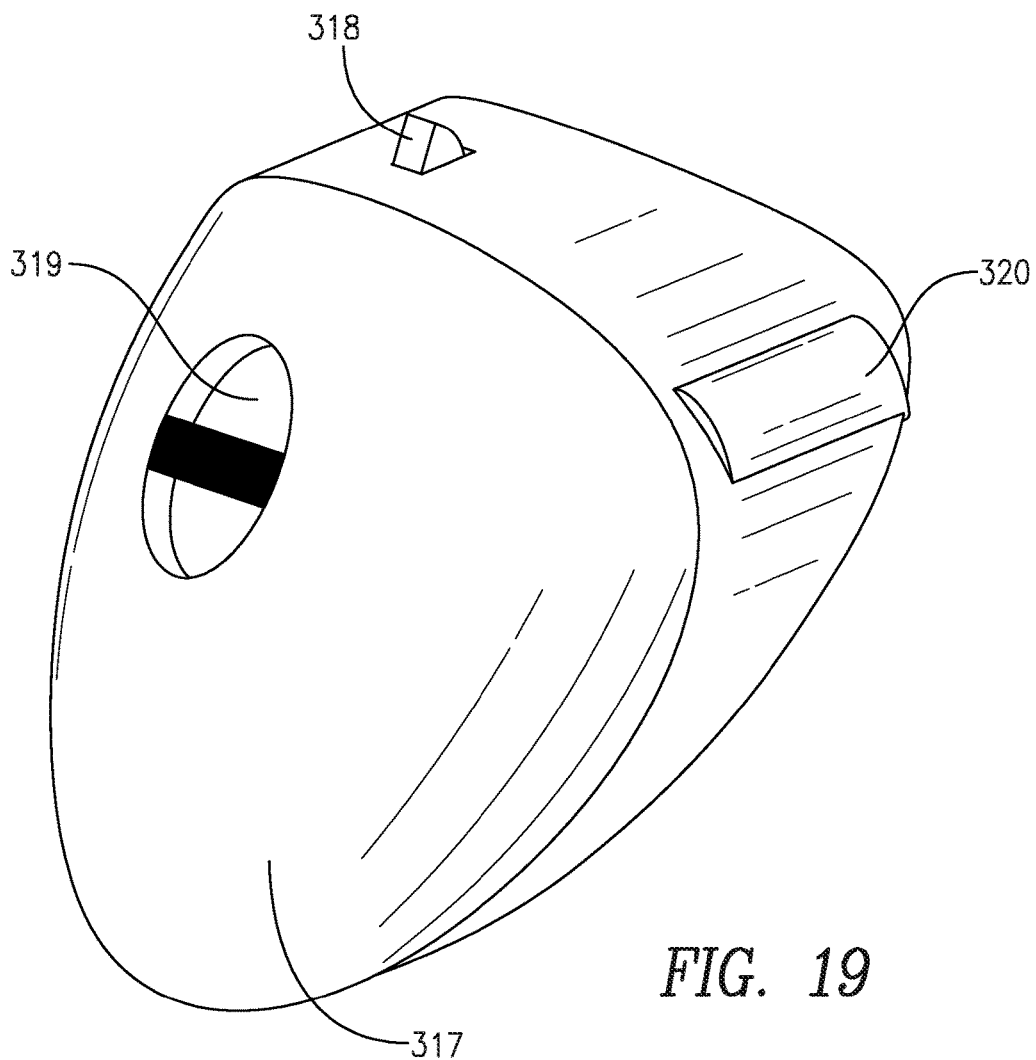
FIG. 19 is perspective view of the main hatch with a dial handle.
Figure 20:
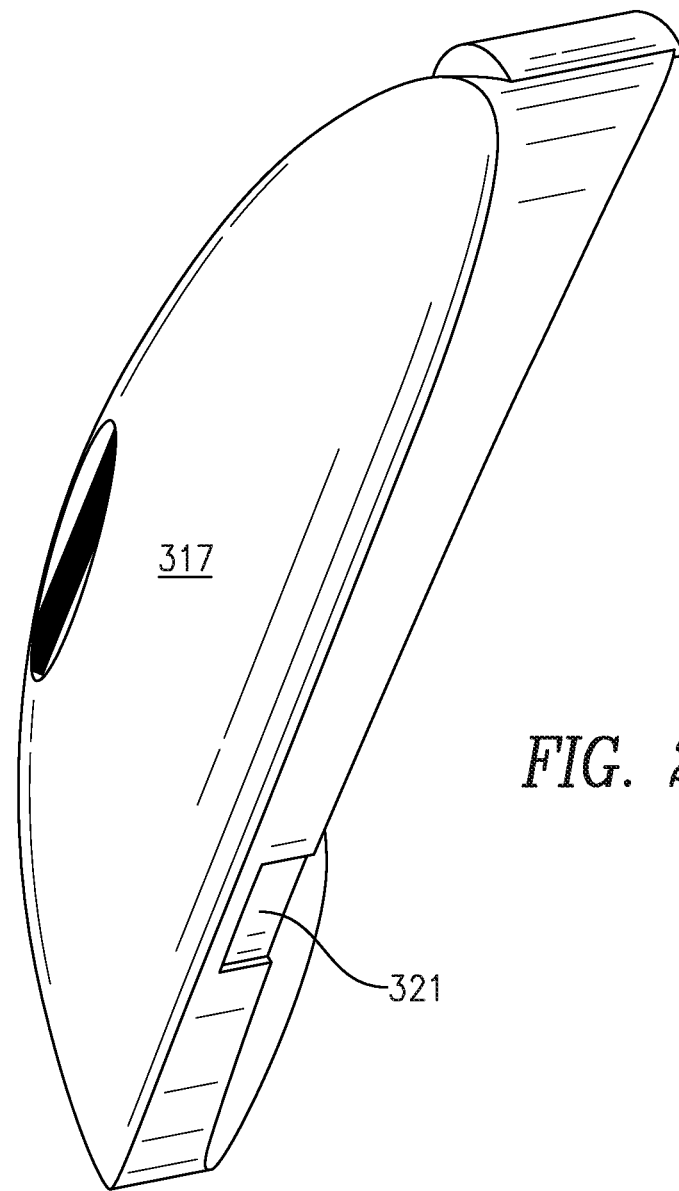
FIG. 20 is another perspective view of the main hatch.

FIGS. 19 and 20 show perspective views of the main hatch 317 with dial handle 319 which is used to open the main hatch 317. The main hatch has a locking mechanism 318 that is released with a torsional spring (not shown) that is connected to the dial handle 319. The spring, by default, forces the latch into a locking position to prevent the main hatch 317 from opening. When the dial handle 19 is rotated, the tension of the torsional spring is increased to release the latch. Springs (not shown) on both sides of the lateral hatch guides 320 force the guides 320 to slide outwards in their corresponding grooves in the body of the container 100 to pop the hatch 317 outward. The hinging mechanism 31 slides forward to allow the main hatch 317 to fold downward.

Figure 21:
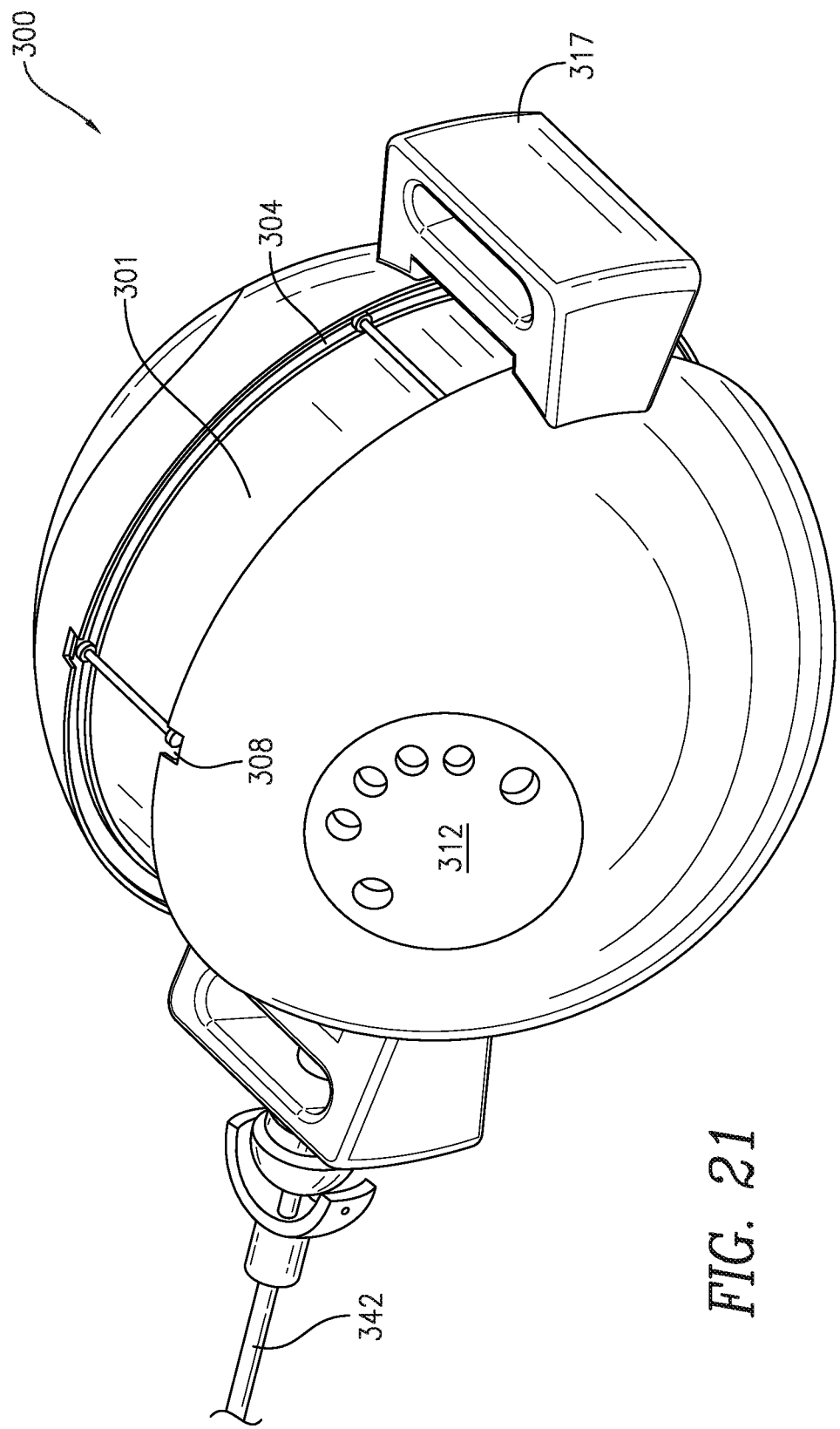
FIG. 21 is a perspective view of the container.

FIG. 21 is a perspective view of an insulated container 100 configured to store consumables, including a hatch 312, slots 308, trench 301, channels 304, and handles 317. The towing bar 342 is coupled to a pivoting connection by a joint connected to the handle 317.

Thus, some embodiments include an insulated container 100 configured to store consumables. The container 100 includes a body 302 having an insulated wall that encompasses a cavity, the cavity configured to hold consumables. The container 100 further includes a circumferential trench 301 configured to wrap around a circumference of the body 302, the trench 301 having opposite facing walls, each wall having a groove configured to receive wheels 5 configured to roll within the groove about the circumference of the body 302. The container 100 further includes a plurality of wheels 5 positioned in the grooves 304 on opposite facing walls and configured to roll while the container 100 remains upright.

According to this aspect, in some embodiments, each pair of a plurality of wheel pairs in opposite facing walls are connected by an axle 306 forming a wheel set. In some embodiments, each axle 306 is covered by a rigid cylindrical tube to enable the tube to function as a solid sleeve bushing bearing. In some embodiments, the container 100 further includes a stringer that snaps to the tube of each wheel pair of a plurality of wheel pairs to hold the wheel pairs in position about a circumference of the body 302. In some embodiments, the grooves 304 have flanges to retain the wheels 5 within the grooves 304. In some embodiments, at a periphery of the container 100, there is a slot on either side of the trench 301, the slots being disposed in the grooves 304 and dimensioned to receive a wheel to enable the wheel to be inserted into a respective groove. In some embodiments, the container 100 further includes a circumferential track wrapping around the circumferential trench 301. In some embodiments, the container 100 further includes connectors on an underside of the track to securely snap the track to a solid sleeve bushing bearing the shrouds an axle 306 connecting a pair of wheels 5 on opposite facing walls of the trench 301. In some embodiments, the track has, at each of two opposite ends, a latching mechanism configured to securely connect the two opposite ends. The container 100 may further include a penetrable membrane in the insulated wall, the membrane being normally closed to form a barrier between air inside and outside the container 100, the membrane being penetrable by force to enable retrieval of an item from the container 100. In some embodiments, the container 100 may further include a removably attachable external saddle tank, shaped conformal to the body 302, the saddle tank being hollow to provide extra buoyancy of the container 100 when the container 100 is in water. In some embodiments, the saddle tank is configured to attach to handles on either side of the body 302. In some embodiments, the container 100 may further include a main hatch configured to latch to the container 100 via a latch system, the latch system having a dial and a torsional spring that is in tension to hold into position at least one latch of the latch system, so that when the dial is turned, the spring tension is altered to withdraw the at least one latch from an engaging slot in order to open the main hatch.

According to another aspect, an insulated container 100 ball is provided, including a body 302, the body 302 being one of spherical and ellipsoidal in shape, the body 302 having an insulated wall that encompasses a cavity. The container 100 ball also has a rotational apparatus having: a circumferential trench 301 around a circumference of the body 302, the trench 301 having walls with a channel 304 in each wall to enable wheels 5 to roll within the channels 304. The rotational apparatus also includes a plurality of pairs of wheels 5, each wheel in a pair being positioned to roll within opposite channels 304 while the container 100 remains upright.

According to this aspect, in some embodiments, opposite wheels 5 of a pair of wheels 5 are connected by an axle 306 about which the wheels 5 in the pair rotate. In some embodiments, each axle 306 is covered by a tube to enable the tube to function as a journal bearing. In some embodiments, the container ball 100 further includes a stringer providing rigid support to the wheels 5 and axles 306 via connecting to the tubes. In some embodiments, the channels 304 have flanges to retain the wheels 5 within the channels 304. In some embodiments, there are a pair of slots, one slot in each channel 304, and configured to receive the wheels 5 into the channels 304.

According to yet another aspect, an insulated container 100 to store items is provided, the container 100 having one of a spherical and an ellipsoidal shape. The container 100 includes a circumferential trench 301 surrounding a body 302 of the container 100 and having two oppositely positioned channels 304, each channel 304 configured to receive wheels 5, the wheels 5 oriented in pairs, each wheel of a pair of wheels 5 oppositely positioned in the channels 304 and connected by an axle 306, the wheels 5 configured to roll while the container 100 remains upright.

It will be appreciated by persons skilled in the art that embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An insulated container configured to store consumables, the container comprising: a body having an insulated wall that encompasses a cavity, the cavity configured to hold consumables; a circumferential trench configured to wrap around a circumference of the body, the trench having opposite facing walls, each wall having a groove configured to receive wheels configured to roll within the groove about the circumference of the body; a plurality of wheels positioned in the grooves on opposite facing walls and configured to roll while the container remains upright; and a removably attachable external saddle tank, shaped conformal to the body, the saddle tank being hollow to provide extra buoyancy of the container when the container is in water.

2. The container of claim 1, wherein each pair of a plurality of wheel pairs in opposite facing walls are connected by an axle forming a wheelset.

3. The container of claim 2, wherein each axle is covered by a rigid cylindrical tube to enable the tube to function as a solid sleeve bearing.

4. The container of claim 3, further comprising a stringer that snaps to the tube of each wheel pair of a plurality of wheel pairs to hold the wheel pairs in position about a circumference of the body.

5. The container of claim 1, wherein the grooves have flanges to retain the wheels within the grooves.

6. The container of claim 1, wherein, at a periphery of the container, there is a slot on either side of the trench, the slots being disposed in the grooves and dimensioned to receive a wheel to enable the wheel to be inserted into a respective groove.

7. The container of claim 1, further comprising a circumferential track wrapping around the circumferential trench.

8. The container of claim 7, further comprising connectors on an underside of the track to securely snap the track to a solid sleeve bushing bearing that shrouds an axle connecting a pair of wheels on opposite facing walls of the trench.

9. The container of claim 8, wherein the track has, at each of two opposite ends, a latching mechanism configured to securely connect the two opposite ends.

10. The container of claim 1, further comprising a penetrable membrane in the insulated wall, the membrane being normally closed to form a barrier between air inside and outside the container, the membrane being penetrable by force to enable retrieval of an item from the container.

11. The container of claim 1, wherein the saddle tank is configured to attach to handles on either side of the body.

12. The container of claim 1, further comprising a main hatch configured to latch to the container via a latch system, the latch system having a dial and a torsional spring that is in tension to hold into position at least one latch of the latch system, so that when the dial is turned, the spring tension is altered to withdraw the at least one latch from an engaging slot in order to open the main hatch.

13. An insulated container ball, comprising: a body, the body being one of spherical and ellipsoidal in shape, the body having an insulated wall that encompasses a cavity; and a rotational apparatus having: a circumferential trench around a circumference of the body, the trench having walls with a channel in each wall to enable wheels to roll within the channels; a plurality of pairs of wheels, each wheel in a pair being positioned to roll within opposite channels while the container remains upright; and a removably attachable external saddle tank, shaped conformal to the body, the saddle tank being hollow to provide extra buoyancy of the container when the container is in water.

14. The insulated container ball of claim 13, wherein opposite wheels of a pair of wheels are connected by an axle about which the wheels in the pair rotate.

15. The insulated container ball of claim 14, wherein each axle is covered by a tube to enable the tube to function as a journal bearing.

16. The insulated container ball of claim 15, further comprising a stringer providing rigid support to the wheels and axles via connecting to the tubes.

17. The insulated container ball of claim 13, wherein the channels have flanges to retain the wheels within the channels.

18. The insulated container ball of claim 13, wherein there are a pair of slots, one slot in each channel, and configured to receive the wheels into the channels.

19. An insulated container to store items, the container having one of a spherical and an ellipsoidal shape, the container comprising: a circumferential trench surrounding a body of the container and having two oppositely positioned channels, each channel configured to receive wheels, the wheels oriented in pairs, each wheel of a pair of wheels oppositely positioned in the channels and connected by an axle, the wheels configured to roll while the container remains upright; and a removably attachable external saddle tank, shaped conformal to the body, the saddle tank being hollow to provide extra buoyancy of the container when the container is in water.

* * * * *